United States Patent Office 3,466,295
Patented Sept. 9, 1969

3,466,295
1-AMINO-2-, 3- OR 4-PHENYL PYRIDINIUM SALTS AND DERIVATIVES
Alexander Crawford Ritchie, Dennis George Cheesman, and Peter Garside, London, and Juliet Mary Waring, Purleigh, Chelmsford, England, assignors to Allen & Hanburys Limited, London, England, a British company
No Drawing. Filed Oct. 18, 1966, Ser. No. 587,430
Claims priority, application Great Britain, Oct. 21, 1965, 44,641/65
Int. Cl. C07d 31/42, 31/44; A61k 27/00
U.S. Cl. 260—296    7 Claims

ABSTRACT OF THE DISCLOSURE

Pyridinium salts of the formula

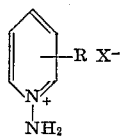

in which R is phenyl unsubstituted or substituted by at least one halogen or alkyl or hydroxy or alkoxy, and $X^-$ is a pharmaceutically acceptable anion, are valuable for their antihypertensive activity.

---

This invention relates to novel heterocyclic compounds having biological activity.

The present invention provides pyridinium salts of the general formula

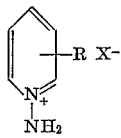

where R is a phenyl radical or a phenyl radical substituted by one or more halogen atoms or one or more alkyl, hydroxy or alkoxy radicals, and X is a pharmaceutically acceptable anion.

Examples of pharmaceutically acceptable anions include halides such as chloride, bromide, iodide, acetate, bicarbonate, succinate, maleate, tartrate and methanesulphonate.

The compounds of Formula I may be prepared by amination of pyridine derivatives of the general formula

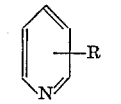

(where R has the meaning given above). For example, compounds of Formula II may be directly aminated with chloramine or with hydroxylamine-O-sulphonic acid or they may be reacted with an arylsulphonyl azide to give a N-arylsulphonamido-pyridine of the general formula

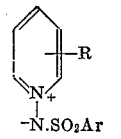

(where R has the meaning given above and Ar is an aryl radical) which may be converted into the desired compound by acid hydrolysis.

In an alternative method of preparing compounds of the general Formula I in which R is in the 4-position of the pyridine nucleus a N-nitrosopiperidine derivative of the general formula

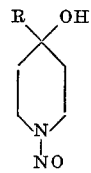

(where R has the meaning given above) is reacted with an acylating agent, such as a mixture of acetic anhydride and acetic acid, to give a pyridine derivative of the general formula

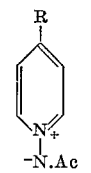

(where R has the meaning given above and Ac is an acyl, preferably acetyl, group) and the pyridine derivative of the general Formula V is then subjected to acid hydrolysis.

The compounds of the present invention are normally isolated from the reaction mixtures as the halides, especially the chlorides or iodides, and these salts may be converted into other desired salts by conventional techniques such as metathesis.

The compounds of the present invention have been found to have useful pharmacological activity and more particularly they exhibit an antihypertensive activity. The compounds may be employed in the usual forms for therapeutic administration. For example, they may be formulated with a pharmaceutical carrier to provide tablets, capsules, suppositories, injection solutions and the like.

The daily dose of the active ingredient is in the range of 5 to 500 mg. depending on the age, weight, and condition of the patient.

The following examples illustrate the invention.

Example 1.—Preparation of 1-amino-4-phenyl-pyridinium iodide 9.1 g. of 4-phenylpyridine was added slowly to a solution of 2.8 g. of hydroxylamine-O-sulphonic acid in 16 ml. of water. The mixture was heated in a steam bath for 20 minutes and then, after cooling, it was basified and the resultant green mixture was distilled to dryness under reduced pressure, keeping the temperature below 40° C. The residue was dissolved in 30 ml. of ethanol and the solution was filtered. The filtrate was acidified with 4 ml. of hydriodic acid (S.G. 1.94) and was then cooled to −20° C. The resulting solid was removed by filtration and crystallised from a mixture of 25 ml. of ethanol and 5 ml. of isopropyl acetate to give a dark brown solid, M.P. 166° C., which was recrystallised to give 1-amino-4-phenylpyridinium iodide, M.P. 171° C.

Example 2.—Preparation of 1-amino-4-phenylpyridinium chloride 103 g. of 1-nitroso-4-phenyl-4-piperidinol, 200 ml. of acetic anhydride and 200 ml. of acetic acid were heated under reflux for 18 hours. Some brown fumes were evolved and the solution turned dark red. After cooling, the reaction mixture was slowly poured into 5 litres of water.

A solid crystallised out and was removed by filtration. The aqueous filtrate was basified with 43% w./v. sodium hydroxide solution and extracted with four 1 litre portions of chloroform. The combined chloroform extracts were extracted twice with 500 ml. of 0.2 N hydrochloric acid. The acid extracts were basified with 43% w./v. sodium hydroxide and extracted with three 300 ml. portions of chloroform. The dark green chloroform extracts were washed with a small quantity of water, dried over sodium sulphate and the solvent removed. The residue was twice recrystallised from a mixture of 100 ml. of chloroform and 100 ml. of benzene to give 1-acetamido-4-phenylpyridine, M.P. 225 to 226° C., of the structure.

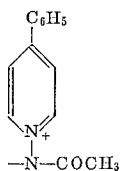

7.4 g. of 1-acetamido-4-phenylpyridine was dissolved in 250 ml. of methanol saturated with hydrogen chloride and the solution was heated under reflux for 4 hours. The methanol was removed and the residue recrystallised from a mixture of 50 ml. of ethanol and 35 ml. of isopropyl acetate to give 1-amino-4-phenylpyridinium chloride as a cream solid, M.P. 210° C.

1-amino-4-phenylpyridinium chloride was converted into the iodide by the following method:

A small quantity of 1-amino-4-phenylpyridinium chloride was heated with acetone and sufficient ethanol to effect solution. A hot acetone solution of sodium iodide was added and the clear solution allowed to cool. The precipitated sodium chloride was removed by filtration and the solution was evaporated to dryness. The residue was recrystallised from ethanol to give 1-amino-4-phenylpyridinium iodide, M.P. 171° C.

Example 3.—Preparation of 1-amino-4-(p-tolyl) pyridinium chloride 1.2 g. of hydroxylamine-O-sulphonic acid was dissolved in 5 ml. of water, 3.5 g. of 4-(p-tolyl) pyridine was added, and the mixture heated at 85 to 90° C. for one hour. The water was removed by heating on the steam bath under reduced pressure and the residue heated under reflux with 10 ml. of acetic anhydride for one hour. The excess anhydride was removed by distillation under reduced pressure and the residue was dissolved in water. Benzene was added and the mixture basified by the addition of solid sodium carbonate. The mixture was filtered and the solid washed with water and benzene. The filtrate was separated and the aqueous layer extracted once with benzene. The aqueous layer was then extracted three times with chloroform and the filtered solid was dissolved in the combined chloroform extracts. The solvent was removed and the residue recrystallised from a mixture of chloroform and benzene. The crystallised material was dissolved in 20 ml. of methanol saturated with hydrogen chloride and the solution was heated under reflux for two hours. The methanol was removed and the residue recrystallised from ethanol to give 1-amino-4-(p-tolyl) pyridinium chloride as a brown solid, M.P. 253–4° C.

Example 4.—Preparation of 1-amino-4-(4-chlorophenyl) pyridinium chloride 3.4 g. of hydroxylamine-O-sulphonic acid was dissolved in 25 ml. of water, 11.4 g. of 4-(4-chlorophenyl) pyridine was added, and the mixture heated at 85–90° C. for one hour. The water was removed by heating on the steam bath under reduced pressure and the residue heated under reflux with 20 ml. of acetic anhydride for one hour. The excess anhydride was removed by distillation under reduced pressure and the residue was dissolved in water. Benzene was added and the mixture basified by the addition of solid potassium carbonate. The mixture was filtered and the solid washed with water and benzene. The solid was dissolved in 100 ml. of hot chloroform, treated with charcoal, filtered, and reduced in volume to 30 ml. The solid obtained on cooling the above solution was filtered, dried, dissolved in 25 ml. of ethanol saturated with hydrogen chloride and the solution was heated under reflux for one hour. The ethanol was removed and the residue recrystallised from a mixture of methanol and isopropanol to give 1-amino-4-(4-chlorophenyl) pyridinium chloride as an off white solid, M.P. 222–3° C.

Example 5.—Preparation of 1-amino-4-(3,4-dimethoxyphenyl)pyridinium chloride 3.0 g. of hydroxylamine-O-sulphonic acid was dissolved in 25 ml. of water, 10.7 g. of 4-(3,4-dimethoxyphenyl) pyridine was added, and the mixture heated at 85–90° C. for one hour. The water was removed by heating on the steam bath under reduced pressure and the residue heated under reflux with 20 ml. of acetic anhydride for one hour. The excess anhydride was removed by distillation under reduced pressure and the residue was dissolved in water. Benzene was added and the mixture basified by the addition of solid potassium carbonate. The mixture was filtered and the solid washed with water and benzene. The filtrate was separated and the aqueous layer extracted once with benzene. The aqueous layer was then extracted three times with chloroform and the filtered solid was dissolved in the combined chloroform extracts. The solvent was removed and the residue recrystallised twice from benzene to give a yellow solid M.P. 162–4° C.

This solid was dissolved in 20 ml. of ethanol saturated with hydrogen chloride and the solution was heated under reflux for one hour. The ethanol was removed and the residue recrystallised from a mixture of methanol and isopropanol to give 1-amino-4-(3,4-dimethoxyphenyl) pyridinium chloride as a yellow solid, M.P. 234–5° C.

Example 6.—Preparation of 1-amino-4-(3,4-dihydroxyphenyl)pyridinium bromide 0.5 g. of the acetamido compound, M.P. 162–4° C., obtained as an intermediate in the preparation of 1-amino-4-(3,4-dimethoxyphenyl)pyridinium chloride was dissolved in a mixture of 1.5 ml. of glacial acetic acid and 1.5 ml. of 48% aqueous hydrogen bromide and the solution was heated under reflux for three hours. The solution was reduced to dryness and the residue recrystallised from a mixture of methanol and isopropanol to give 1-amino-4-(3,4-dihydroxyphenyl)pyridinium bromide as a yellow/green solid, M.P. 232–3° C.

Example 7.—Preparation of 1-amino-2-phenylpyridinium chloride 21 g. of 2-phenylpyridine was added to a freshly prepared solution of 6.2 g. of hydroxylamine-O-sulphonic acid in 50 ml. of water. The resulting suspension was then heated on the steam bath for one hour, during which time most of the pyridine dissolved into the aqueous solution which became yellow in colour. The initial effervescence had ceased at the end of thirty minutes.

Water was removed at 40° C. under reduced pressure and the resulting yellow oil was heated under reflux with 100 ml. of acetic anhydride, for three hours. Removal of the excess acetic anhydride under reduced pressure gave a brown oil which was then dissolved in 80 ml. of water and basified with sodium carbonate. Extraction with benzene (3×50 ml.) removed unreacted 2-phenylpyridine.

The aqueous solution was extracted with chloroform (continuous extraction for two days). After drying over magnesium sulphate, the chloroform extract was evaporated to give a brown oil which began to solidify on standing. This was dissolved in 100 ml. of methanol saturated with dry hydrogen chloride and heated under reflux for two hours. Removal of volatile materials gave a brown oil which was recrystallised from ethanol/ethyl acetate (with charcoal) to give 1-amino-2-phenylpyridinium chloride as yellow crystals, M.P. 193–4° C.

Example 8.—Tablets

|  | Per tablet (mg.) | For 4,000 (g.) |
|---|---|---|
| 1-amino-4-phenylpyridinium chloride | 100 | 400 |
| Calcium sulphate | 356 | 1,424 |
| Dry maize starch | 30 | 120 |
| Amigel | 10 | 40 |
| Magnesium stearate | 4 | 16 |

All the materials were sifted through a No. 60 B.S. mesh sieve, mixed together thoroughly, then compressed to hard slugs of ½″ diameter. The slugs were reduced to granules by passing through a No. 16 B.S. mesh sieve, and finally compressed in a conventional tablet machine to give tablets each weighing 500 mg. and containing 100 mg. of the active ingredient.

In the above tablet, the amount of active ingredient may be varied widely, and the chloride may be replaced by any other salt having a pharmaceutically acceptable anion.

Various well known pharmacologic procedures were carried out in dogs and cats to ascertain the antihypertensive activity of 1-amino-4-phenylpyridinium chloride.

The control blood pressure and heart rate of renal hypertensive dogs was determined, then 1-amino-4-phenylpyridinium chloride was administered daily for 10 consecutive days in a soft gelatin capsule, at a dose level of 5 mg./kg. On the first day of the administration the compound elicitated a large and sustained increase in blood pressure. Subsequent daily administration did not cause a rise in blood pressure. The dogs showed a decline in blood pressure of 30–60 mm. Hg range, with no change in heart rate, which reached a maximum after 2–3 days, and was maintained throughout the 10 days of administration. The blood pressure of the dogs returned to pretreatment levels 3–6 days after withdrawal of the drug.

Experiments showed that the rise in blood pressure produced when 1-amino-4-phenylpyridinium chloride was first administered could be avoided by the administration of small amounts of the drug in daily divided doses, and then gradually increasing the dose level over several days until an antihypertensive response was obtained. The drug was given orally at a dose level of 0.25 mg./kg. twice daily for 2 days to renal hypertensive dogs, then the dose level was raised to 0.5 mg./kg. twice daily for 2 days, then to 1.0 mg./kg. twice daily for 7 days. This administration did not elicit a rise in blood pressure. Doses of 0.5 mg./kg. lowered the blood pressure gradually over the 2 days of administration by approximately 30 mm. Hg. On increasing the dose level to 1.0 mg./kg. twice daily, the blood pressure fell a further 20 mm. Hg, but continued dosing did not maintain this fall. After 7 days the dose level was increased to 2 mg./kg. twice daily for 7 days, whereon the blood pressure was again reduced and the fall was maintained. After withdrawal of the drug the blood pressure returned to near normal levels after 7–14 days.

All dogs remained healthy during drug administration, and there were no visible signs of impaired sympathetic activity. In addition, no marked tolerance to the antihypertensive action of 1-amino-4-phenylpyridinium chloride was observed when the drug was administered over a 10-day period.

In anesthetized dogs, the rise in blood pressure elicited by the bilateral occlusion of the common carotid arteries was consistently reduced by the intravenous administration of 1-amino-4-phenylpyridinium chloride at dose levels of 1 mg./kg. and above. The effect was of long duration and the response did not usually recover before the experiment was terminated (4–6 hr.).

Acute studies were then carried out in anaesthetized cats. The intravenous administration of 1-amino-4-phenylpyridinium chloride at a dose level of 5 mg./kg. produced an initial rise followed by a fall in blood pressure. Larger doses, 10 mg./kg. produced a fall in blood pressure of 40–60 mm. Hg for greater than 60 min.

What is claimed is:

1. A pyridinium salt of the formula

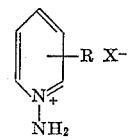

wherein R is selected from the group consisting of phenyl and phenyl substituted by at least one halogen, lower alkyl, hydroxy, or lower alkoxy, X is a pharmaceutically anion.

2. A pyridinium salt as claimed in claim 1 wherein X is halogen.

3. A pyridinium salt as claimed in claim 1 wherein R is phenyl and X is halogen.

4. A pyridinium salt as claimed in claim 1 wherein R is p-tolyl and X is chlorine.

5. A pyridinium salt as claimed in claim 1 wherein R is chlorophenyl and X is chlorine.

6. A pyridinium salt as claimed in claim 1 wherein R is 3,4-dimethoxyphenyl and X is chlorine.

7. A pyridinium salt as claimed in claim 1 wherein R is 3,4-dihydroxyphenyl and X is bromine.

References Cited

UNITED STATES PATENTS 3,168,503  2/1965  Kramer et al. _____ 260—296

OTHER REFERENCES

Okamoto et al.: Chem. Abstracts, vol. 59, par. 5130 (1963).

HENRY R. JILES, Primary Examiner

ALAN L. ROTMAN, Assistant Examiner

U.S. Cl. X.R.

260—294.8, 295; 424—263, 266